United States Patent
Leoni et al.

(10) Patent No.: US 10,224,002 B2
(45) Date of Patent: Mar. 5, 2019

(54) CONSTRAINING A SUBSTRATE VIA ACTUABLE SLOTS TO WRITE INFORMATION

(71) Applicant: Hewlett-Packard Development Company, L.P., Fort Collins, CO (US)

(72) Inventors: Napoleon J Leoni, Palo Alto, CA (US); Omer Gila, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 282 days.

(21) Appl. No.: 15/036,793

(22) PCT Filed: Dec. 23, 2013

(86) PCT No.: PCT/US2013/077570
§ 371 (c)(1),
(2) Date: May 13, 2016

(87) PCT Pub. No.: WO2015/099672
PCT Pub. Date: Jul. 2, 2015

(65) Prior Publication Data
US 2016/0293136 A1    Oct. 6, 2016

(51) Int. Cl.
*G06K 19/06*      (2006.01)
*G06K 17/00*      (2006.01)
(Continued)

(52) U.S. Cl.
CPC ............ *G09G 5/006* (2013.01); *G06K 7/081* (2013.01); *G06K 17/0003* (2013.01);
(Continued)

(58) Field of Classification Search
CPC ............ G06K 17/0003; G06K 19/0615; G06F 17/242
(Continued)

(56) References Cited

U.S. PATENT DOCUMENTS 5,191,198 A   3/1993   Do
5,866,284 A   2/1999   Vincent
(Continued)

FOREIGN PATENT DOCUMENTS

| CN | 101404068 | 4/2009 |
| CN | 102789661 | 11/2012 |
| KR | 20090087620 | 8/2009 |

OTHER PUBLICATIONS

Stephenson, S.W. et al.; "16.3: Development of a Flexible Electronic Display Using Photographic Technology"; May 20, 2004; https://onlinelibrary.wiley.com/doi/pdf/10.1889/1.1821394.

*Primary Examiner* — Toan Ly
(74) *Attorney, Agent, or Firm* — HP Inc. Patent Department

(57) ABSTRACT

The present disclosure describes writing information on substrate displays. In an example, a display on a substrate is interfaced. The interfacing includes constraining a first longitudinal side of the substrate via a first actuable slot. Further, a second longitudinal side of the substrate opposite to the first longitudinal side is constrained via a second actuable slot. Thereby the substrate is constrained between the first and second slot with the display positioned therebetween. Further, the display is operated to write information thereon via an imager while the substrate is constrained between the first and second slot.

15 Claims, 12 Drawing Sheets

(51) Int. Cl.
  *G06F 17/24* (2006.01)
  *G09G 5/00* (2006.01)
  *G06K 7/08* (2006.01)
  *G09G 5/24* (2006.01)
  *G09G 3/34* (2006.01)

(52) U.S. Cl.
  CPC .... *G06K 19/0615* (2013.01); *G06K 19/06112* (2013.01); *G09G 3/344* (2013.01); *G09G 5/24* (2013.01); *G06F 17/242* (2013.01); *G09G 3/34* (2013.01); *G09G 2380/04* (2013.01)

(58) Field of Classification Search
  USPC .................................................. 235/493, 487
  See application file for complete search history.

(56) References Cited

U.S. PATENT DOCUMENTS

| | | | |
|---|---|---|---|
| 5,940,173 A * | 8/1999 | Tomii | G01N 21/95 |
| | | | 356/445 |
| 5,966,160 A * | 10/1999 | Nardone | B08B 7/0028 |
| | | | 347/218 |
| 6,333,754 B1 | 12/2001 | Oba et al. | |
| 6,515,790 B2 | 2/2003 | Miyamoto et al. | |
| 6,982,734 B2 | 1/2006 | Pan | |
| 7,140,550 B2 | 11/2006 | Ramachandran | |
| 7,580,845 B2 | 8/2009 | Burman et al. | |
| 8,144,388 B2 | 3/2012 | Ogawa | |
| 8,418,917 B1 | 4/2013 | Lewis et al. | |
| 8,444,053 B2 | 5/2013 | Harris | |
| 8,514,256 B2 | 8/2013 | Ogawa et al. | |
| 2003/0057278 A1 | 3/2003 | Wong | |
| 2003/0067427 A1 | 4/2003 | Comiskey et al. | |
| 2005/0053406 A1 * | 3/2005 | Jones | B41J 2/315 |
| | | | 400/120.01 |
| 2005/0134550 A1 | 6/2005 | Schmitz | |
| 2005/0289080 A1 * | 12/2005 | Rhiando | G06Q 20/3674 |
| | | | 705/64 |
| 2006/0017659 A1 | 1/2006 | Ogawa et al. | |
| 2006/0125778 A1 | 6/2006 | Apte | |
| 2006/0132429 A1 | 6/2006 | Ricks et al. | |
| 2007/0045399 A1 | 3/2007 | Martin | |
| 2009/0074217 A1 | 3/2009 | Freels et al. | |
| 2009/0091148 A1 * | 4/2009 | Hautvast | G06K 7/0021 |
| | | | 360/78.04 |
| 2009/0267872 A1 | 10/2009 | Silverbrook | |
| 2011/0298760 A1 | 12/2011 | Gila et al. | |
| 2012/0067949 A1 | 3/2012 | Harris | |
| 2012/0109735 A1 | 5/2012 | Krawczewicz et al. | |
| 2012/0206341 A1 | 8/2012 | Gila et al. | |
| 2012/0320001 A1 | 12/2012 | Gila et al. | |
| 2013/0003162 A1 * | 1/2013 | Leoni | G02F 1/167 |
| | | | 359/296 |
| 2013/0191279 A1 | 7/2013 | Calman et al. | |
| 2013/0235446 A1 | 9/2013 | Leoni et al. | |
| 2014/0210805 A1 | 7/2014 | Birecki et al. | |
| 2014/0239068 A1 | 8/2014 | Park | |
| 2014/0253426 A1 | 9/2014 | Leoni et al. | |

* cited by examiner

CONSTRAINING A SUBSTRATE VIA ACTUABLE SLOTS TO WRITE INFORMATION

BACKGROUND

There are a variety of applications in which it is advantageous to interact with a user via a substrate including an information display. Examples of such substrates include handheld cards or labels including a display region to show information for a user. Such a handheld card may be used for a variety of applications including security access cards or gift cards.

The information display may be a rewritable display in which information might be dynamically rewritten. For example, when entering a facility, a writing device may write text and/or images onto an electronic imaging substrate strip of a security card. The text may indicate the time and date of entry while the images may include various logos that change by the day and that security personnel will recognize. In another example, a gift card may have an initial balance displayed onto an electronic imaging substrate strip. When a customer uses the gift card, the new balance can be rewritten by a writing device used by the retailer. Additionally, various logos or advertisements may be rewritten onto the electronic imaging substrate strips of the cards as customers use the card.

BRIEF DESCRIPTION OF THE DRAWINGS

In order that the present disclosure may be well understood, various examples will now be described with reference to the following drawings.

DETAILED DESCRIPTION

In the following description, numerous details are set forth to provide an understanding of the examples disclosed herein. However, it will be understood that the examples may be practiced without these details. While a limited number of examples have been disclosed, it should be understood that there are numerous modifications and variations therefrom. Similar or equal elements in the Figures may be indicated using the same numeral.

As mentioned above, a substrate may include a re-writable display that can be used to display information to a user. In the rewritable display, information might be dynamically written. For the dynamic writing, a writing system can be used. However, it might be challenging to provide systems that can adequately write information on the substrate while providing a satisfactory user experience during the writing experience.

In light of this, and other factors, the present disclosure describes a writing device with a substrate constraining arrangement configured to suitably constrain the substrate during writing while allowing a user to externally monitor the information being written on the substrate display.

Figure 1A:
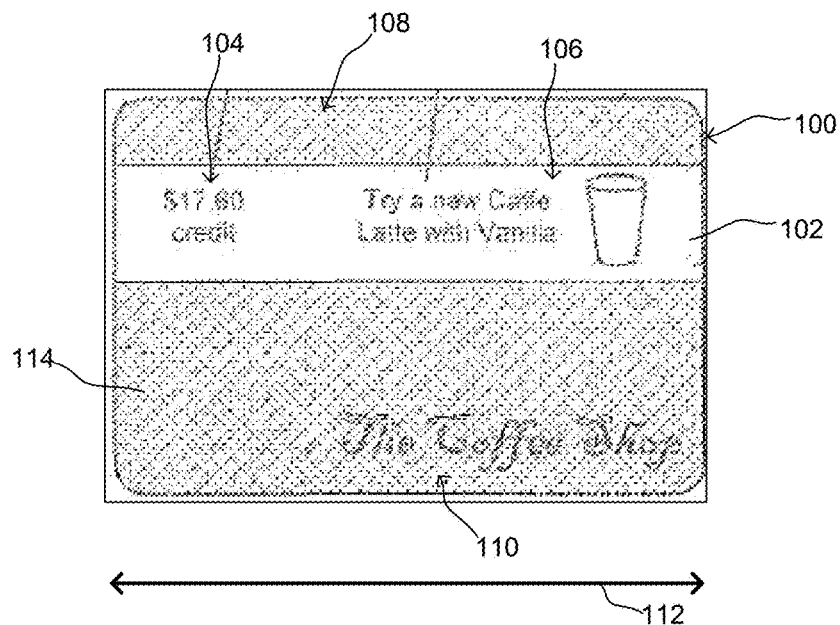
FIG. 1A is a schematic illustration of a substrate including a display.

FIG. 1A shows a substrate 100 including a variable display 102. FIG. 1A illustrates substrate 100 as a gift card in which a remaining amount of credit and marketing information 106 are displayed in display 102. As illustrated in FIG. 1A, substrate 100 includes a first longitudinal side 108 and a second longitudinal side 110 opposite to first longitudinal side 108. Display 102 is provided between first and second longitudinal sides 108, 110.

Display 102 may correspond to any display type suitable to dynamically modify information shown thereon. For example, display 102 may correspond to a quasi-permanent display such as electronic paper (e-paper). E-paper may be composed of a set of sandwiched layers. One layer may include an array of embedded, spherically-shaped microcapsules. Another layer may be a conductive ground layer contiguous to the micro-capsule layer. A further layer composed of a transparent conductive material may be provided contiguous to the micro-capsule layer. The microcapsules can be filled with one or more pigment particles that can be used to display images by looking at the e-paper from the insulating layer side. The conductive layer may serve as ground layer for externally writing on the e-paper using an ion source as further described below with respect to FIG. 2.

Substrate 100 includes a body 114 made of plastic or any other suitable material. Body 114 may be flexible to prevent damages on substrate 100 caused by excessive bending or other unintended strain exerted thereon. Electronic paper as display element facilitates a flexible implementation of substrate 100. A flexible substrate is convenient for implementing robust cards that may be carried on a pocket, wallet or similar. Moreover a certain flexibility of substrate 100 facilitates a planar constraining thereof that facilitates externally writing on display 102 as further described below.

Display 102 may be provided with an e-paper configuration that omits a circuitry underneath for writing information thereon. In other words, display 102 may be provided with passive electronic paper that omits an electrode array for addressing single pixels and other active elements such as a processor for operating the electrode array or an energy source for energizing the electrodes and the processor. The writing process may be performed using a charge source as further detailed below with respect to FIG. 2. More specific examples on how such an e-paper structure may be constituted are further detailed in US patent application with publication number US20110298760, which is incorporated herein by reference in its entirety (to the extent in which this document is not inconsistent with the present disclosure) and in particular those parts thereof describing e-paper configurations.

As used herein, a longitudinal side of substrate 100 refers to a substrate side in the direction of a length of the substrate. In the illustrated example, substrate 100 is rectangular and first and second longitudinal sides correspond to a longest length 112 of the substrate. It will be understood that a longitudinal side must not correspond to a longest length of a substrate.

Figure 1B:
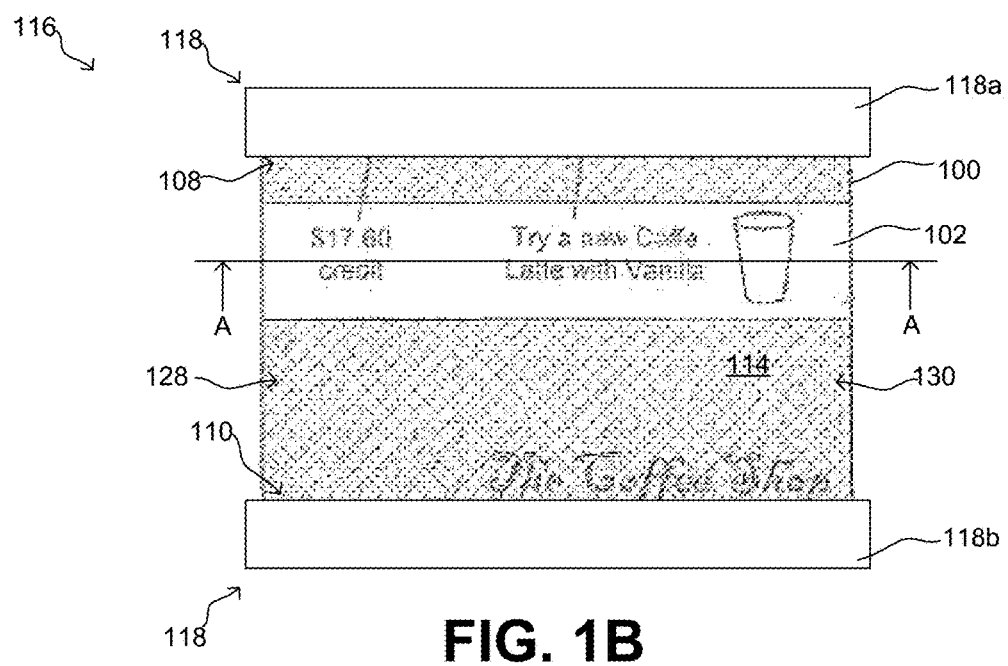
FIG. 1B is a schematic top view of the substrate of FIG. 1A constrained by a constraining arrangement.

FIG. 1B shows a side view of a portion of a system 116 to write information on display 102 of substrate 100. System 116 includes a constraining arrangement 118 to constrain substrate 100 so that information can be written on display 102 as further set forth below. Constraining arrangement is shown with a first constraining element 118a to constrain substrate 100 at first longitudinal side 108 and a second constraining element 118b to constrain substrate 100 at second longitudinal side 110. As illustrated below with respect to FIGS. 1C and 1D, constraining elements 118a, 118b include actuable slots for receiving sides 108, 110 of substrate 100 and effect the constraining by reduction of the slot width.

In the example of FIG. 1B, constraining arrangement 118 is designed to receive substrate 100 in a landscape position. In other words, constraining elements 118a, 118b correspond to the longest longitudinal sides of substrate 100, i.e., first and second longitudinal sides 108, 110. In other examples, a constraining arrangement can be designed to receive substrate 100 in a portrait position. In other words, constraining elements 118a, 118b may correspond to the short longitudinal sides of substrate 100, i.e., longitudinal sides 128, 130.

Figure 1C:
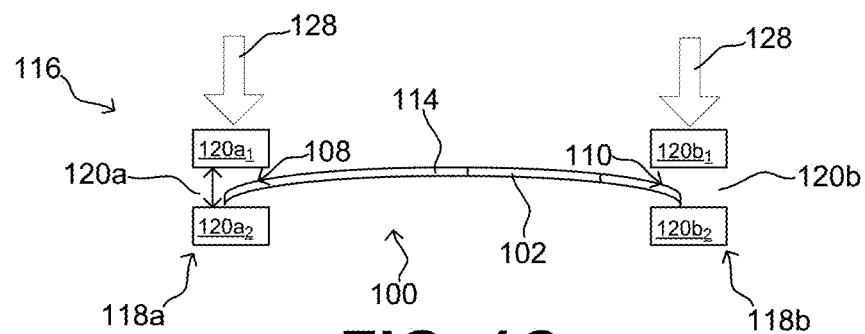
FIG. 1C is a schematic front view of the substrate of FIG. 1A constrained by a constraining arrangement in an open position.
Figure 1D:
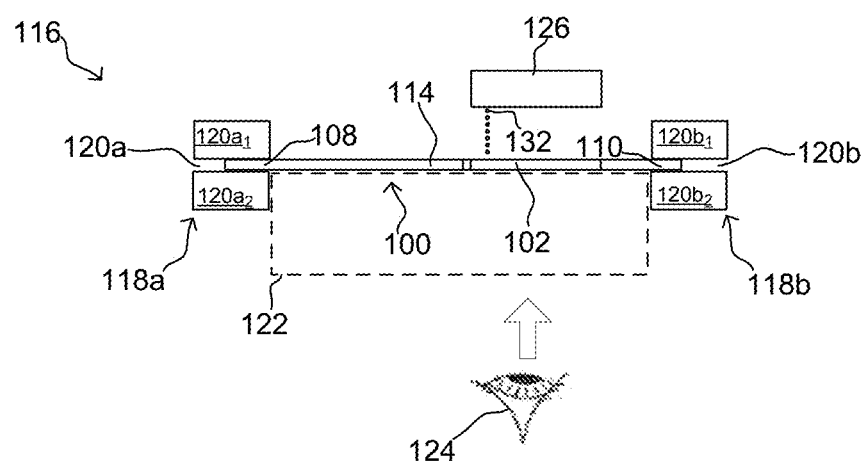
FIG. 1D is a schematic front view of the substrate of FIG. 1A constrained by a constraining arrangement in a closed position.

FIG. 1C shows a front view of the portion of writing system 116 shown in FIG. 1B. As shown in FIG. 1C, a first slot 120a is formed at a gap of first constraining element 118b formed between two opposing slot members 120a₁, 120a₂. A second slot 120b is formed at a gap of second constraining element 118b between two opposing slot members 120b₁, 120b₂. Slots 120a, 120b are actuable for effecting the constraining of substrate 100. An open position of slots 120a, 120b is shown in FIG. 1C; a closed position of slots 120a, 120b is shown in FIG. 1D. Slots 120a, 120b are to receive respective longitudinal sides 108, 110 of substrate 100. Therefore, constraining arrangement 118 is dimensioned according to the dimensions of the specific type of substrate to be processed by writing system 116.

For at least some applications, substrate 100 may be flexible and be bent when no pressure is exerted thereon. A bent substrate 100 is shown in FIG. 1C, the substrate curvature being exaggerated for the sake of illustration. For externally writing on display 102 it might be advantageous that substrate 100 is held flat, since a certain curvature of display 102 may compromise quality of information written thereon.

According to some examples herein, actuable slots 120a, 120b that receive longitudinal sides of the substrate provide a required flatness to substrate 100 thereby facilitating writing on display 102 and visual access thereto during the writing process. A user can then externally monitor the information being written on the substrate display.

Slots 120a, 120b are actuable so as to respectively constrain first and the second longitudinal substrate sides 108, 110. In the illustrated example of FIG. 1, the constrainment is implemented by effecting a reduced slot width. However, it will be understood that any suitable constrainment approach may be applied. For example, constraining forces may be applied at the slot via electrostatic actuation or by other means such as by a vacuum constrainment.

As used herein, a slot width refers to the extent from slot member to slot member. Slot width is indicated in FIG. 1C by the up down arrows between, respectively, slot members 120a₁-120a₂ and slot members 120b₁-120b₂.

In the illustrated example, slots 120a, 120b can be actuated in a downward direction 128 to constrain substrate 100 as shown in FIG. 1D. It will be understood that there are a variety of options for constraining substrate 100. Slots 120a, 120b can be actuated in any suitable direction that facilitates reducing the slot width.

In at least some examples herein, slots 120a, 120b are operatively coupled to an actuation mechanism (not shown) that imparts the constraining force to the slots. The actuation mechanism includes suitable elements to effect the constraining by imparting movement to the slot elements. For example, such an actuation mechanism may include a combination of mechanical linkages and clamps that actuate the slot elements and enables generation of the constraining forces. Such an actuation mechanism may be automatically or manually actuated to engender the necessary torques for the constraining. Some examples of actuation mechanisms are illustrated below with respect to FIGS. 4A, 4B.

FIG. 1D shows a front view of the portion of writing system 116 shown in FIG. 1B with slots 120a, 120b in a closed position. As illustrated by FIG. 1C, slots 120a, 120b in the closed position facilitate that substrate 100, and consequently display 102, lies flat. A transparent volume 122 is formed between first and second slot 120a, 120b so that display 102 is externally viewable by a user 124 while first and the second longitudinal substrate sides 108 are constrained at first and second slot 120a, 120b. Transparent volume 122 may be an empty space or include a transparent element such as glass, transparent plastic or the like extending between constraining elements 118a, 118b.

As shown in FIG. 1D, system 116 includes an imager 126 to operate display 102 in an area opposite to transparent volume 122 while first and second longitudinal substrate sides 108, 110 are constrained by first and second slots 120a, 120b. Imager 126 may write on display 102 by projecting charges 132 on display 102 so as to change pixel states. As can be noticed from FIG. 1D, system 116 provides the required flatness to substrate 100 without hindering writing on display 102. Moreover, a user 124 has real-time visual access the information being written on the substrate display 102.

In the example of FIGS. 1A to 1D, the slots for card constraining are continuous. In other words, slot members 120a₁, 120a₂, 120b₁, 120b₂ are continuous edges to contact respective longitudinal sides 108, 110 when slots 120a, 120b are closed. In other examples, the slots may be discontinuous so that the slot members contact multiple segments of the longitudinal sides when the slots are closed. Generally, the slot members are dimensioned and positioned to contact a sufficiently high area of the substrate.

System 116 may be designed such that the portion of the media to be constrained results in a sufficient increase in substrate stiffness effected by the slot reduction. A ratio of the stiffnesses between a constrained case (e.g., the state of substrate 100 shown in FIG. 1D) to the unconstrained case (e.g., the state of substrate 100 shown in FIG. 1C) can be used to estimate the relationship of width of the substrate covered by the slots and how much an initial deflection of the substrate away from a flat shape can be reduced. As used herein, the stiffness of the substrate refers to the measured of the resistance it offers to deformation. The stiffness may be mathematically defined as $k=F/\delta$, where F is the force applied to the substrate, and δ is the displacement produced by the force along the same degree of freedom. This mathematical definition can be used to compute the ratio referred to above.

For example, the slots may be to receive between 10 and 45% of a front surface of the substrate. An edge coverage of one of the slots may have a width of at least 2 mm. As illustration, if the substrate is sized as a credit card, the substrate may have a bent shape in an unconstrained state. The bent shape may have a bow of about 1 mm. In order to decrease that to about 50 µm, where it would not interfere greatly with at least some of the writing systems illustrated herein, then a 20× reduction of the bow might be required. This might imply a roughly 20× increase in the stiffness of the substrate. This may be achieved by sizing the slot members to cover 40% of the surface of the substrate. Thereby, 60% of the surface of the substrate would still be free for providing the surface onto which information can be written and monitored by an external user.

Figure 2:
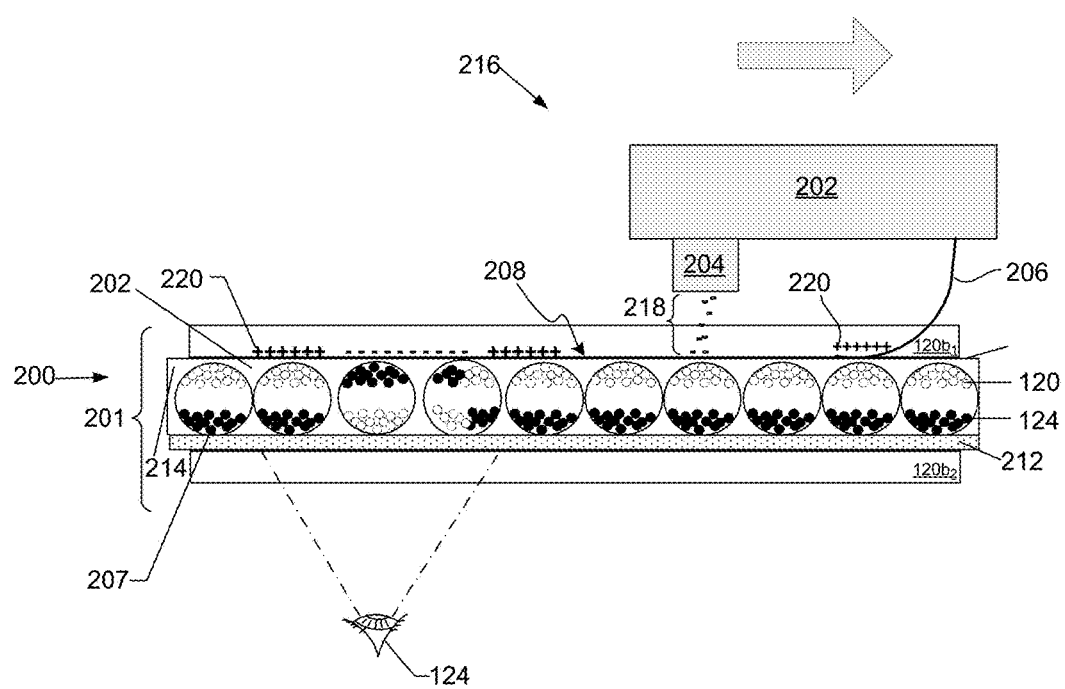
FIG. 2 is a schematic cross-section of a substrate during operation of a writing system according to examples herein.

FIG. 2 shows a cross-section of a substrate 200 during operation of a writing system 216 to write information on an electronic paper display 201. The cross-section is along the electronic display, for example as illustrated by line AA in FIG. 1B.

The cross-sectional view shows an illustrative multilayer structure of substrate 200, including an electronic paper layer 201 with microcapsules 207 sandwiched between a charge receiving surface 208 and a conductive ground layer 212. Microcapsules 207 are held within a matrix 214. It will be understood that the electronic paper illustrated in FIG. 2 is merely an example and that other types of electronic paper might be implemented in examples herein.

Writing system 216 is illustrated including a writing module 202, a writing unit 204, and an erasing unit 206. Writing unit 204 and erasing unit 206 are connected to the same side of writing module 202 that faces chargeable surface 208. During the writing process, substrate 200 is constrained by slots 120a, 120b (only slot members 120b₁, and 120b₂ are depicted in FIG. 2) with writing unit 204 suspended above surface 208. Further, a user 124 has access to an image being written on electronic display 201 via the transparent volume formed between slots 120a, 120b (e.g. transparent volume 122 shown in FIG. 1D).

In the example of FIG. 2, writing unit 204 is an ion head. Erasing unit 206 can be an electrode that comes into close contact with, or can be dragged along, surface 208 in front of ion head 204. Writing module 202 can be moved in the direction indicated by the arrow and e-paper display 201 can be held stationary. Alternatively, the e-paper display 201 can be moved in the opposite direction and writing module 202 held stationary. Alternatively, writing module 202 and e-paper display 201 can be moved simultaneously. In the example shown in FIG. 2, the black particles and the white particles of the microcapsules are positively charged and negatively charged, respectively. Erasing unit 206 erases any information stored in the microcapsules prior to writing information with ion head 204. In the example shown in FIG. 2, as e-paper display 201 passes under writing module 202, positively charged erasing unit 206 can remove negatively charged ions that are attached to surface 208. Positively charge erasing unit 206 also creates electrostatic forces (illustrated by positive charges 220) that drive positively charged black particles away from chargeable surface 208 and attract negatively charged white particles toward chargeable surface 208. By passing erasing unit 206 over chargeable surface 208, information written to e-paper display 201 is erased by positioning the negatively charged white particles near the top of the microcapsules and pushing the positively charged black particles to the bottom of the microcapsules.

FIG. 2 also shows an illustrative writing operation performed by ion head 204. Ion head 204 is designed and operated to selectively eject electrons 218, shown as black bars, toward chargeable surface 208, when a region of the e-paper display 201 located beneath ion head 204 is to be changed from white to black. It will be understood that any other suitable charge source, e.g. a positive ion source, might be used in the writing unit. As electrons 218 reach surface 208, the negatively charged white particles are repelled and driven away from charge receiving surface 108, while the positively charged black particles are attracted to negatively charged electrons/ions 218 and driven toward chargeable surface 218. For example, as ion head 204 passes over microcapsule 207 while ejecting electrons, the negatively charged white particles are repelled away from chargeable surface 218 and the positively charged black particles are driven toward chargeable surface 208.

The e-paper writing system 216 is not limited to implementations in which ion head 204 discharges electrons and erasing unit 206 erases information with positive charges. Microcapsules 207 in the e-paper layer can be composed of negatively charged black particles and positively charged white particles. In other embodiments, the ion head 204 can be designed to produce positively charged ions, which are absorbed by surface 208. Erasing unit 206 can use negative charges to erase information stored in the microcapsule layer of the e-paper display 201. In other examples, writing unit 204 can be any charge injection device with sufficient addressability and resolution. For example, writing unit 204 can be a plasma generating needle. Some other examples of write systems are illustrated in granted U.S. Pat. No. 6,982,742 and U.S. patent application with publication number 20110298760, which are incorporated herein by reference in its entirety (to the extent in which this document is not inconsistent with the present disclosure) and in particular those parts thereof describing e-paper and writing systems configurations.

In at least some of the examples herein, the constraining slots are provided in a moveable tray. In an open position of the tray the substrate can be inserted in or extracted from the first and second slots. In a closed position of the tray, the card can be operated by the imager. An example of such a configuration is illustrated in the following with respect to FIGS. 3A to 3C.

Figure 3A:
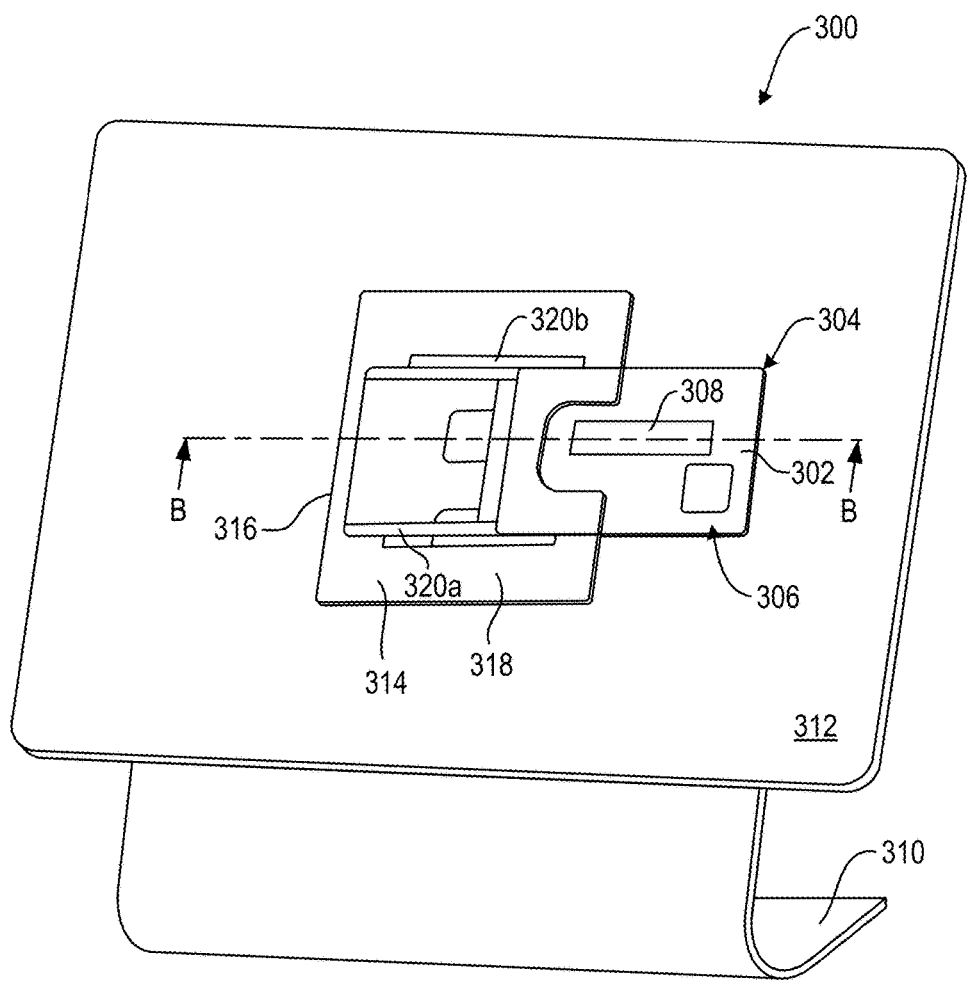
FIG. 3A is a schematic perspective of a system to write information on a substrate according to examples herein.

FIG. 3A is a schematic perspective of a system 300 to write information on a substrate 302. In this specific system substrate 302 is a card. Card 302 includes a first longitudinal side 304 and a second longitudinal side 306 opposite to first longitudinal side 304. Card 302 further includes a display 308 including electronic paper to display information thereon. Display 308 may be constituted analogously as described above with respect to FIG. 2.

Write system 300 includes a bottom support 310 to support a main body 312 of the write system on a flat surface (not shown). Main body 312 includes the mechanisms to perform the writing on card 302 such as, for example, a charge source (shown in FIG. 2 below) to produce a charge beam to write on the electronic paper as illustrated above with respect to FIG. 2.

A moveable tray 314 is hinged to an edge 316 of main body 312 so that it can move from an open position (illustrated below with respect to FIG. 3B) to a closed position ((illustrated below with respect to FIG. 3C). It will be understood that other types of moveable trays may be implemented. For example, a slide tray may be implemented. Such a slide tray may be slidable into main body 312.

Tray 314 includes a transparent front plate 318 that facilitates that display 308 can be viewed by a user once card 302 is inserted into tray 314 and, more specifically, while information is being written on display 308. Transparent front plate 318 may be made of a suitable transparent material such as a transparent plastic (e.g. polycarbonate) or glass. Alternative implementations of the front plate are foreseen. For example, the front plate may have an opaque frame surrounding a transparent window. Display 308 may be viewable through the transparent window once card 302 is inserted.

Tray 314 includes a constraining arrangement with a first constraining element 320a for receiving first substrate longitudinal side 304 and a second constraining element 320b for receiving second substrate longitudinal side 306. Constraining elements 320a, 320b may be constituted analogously as constraining elements 320a, 320b described above with respect to FIGS. 1A to 1C. An example of an arrangement of constraining elements 320a, 320b is set forth below with respect to FIGS. 4A and 4B.

Figure 3B:
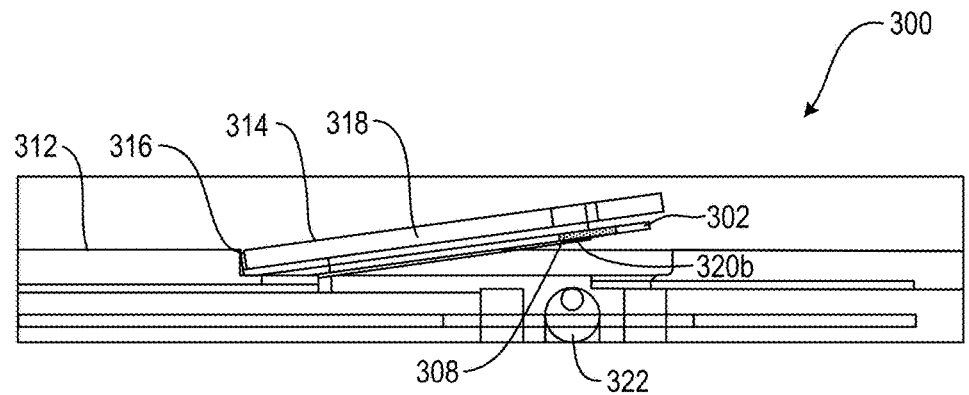
FIGS. 3B and 3C are schematic cross sectional views of the system of FIG. 3A in, respectively, an open and a closed position.

FIG. 3B is a cross sectional view of a portion of write system 300 along line BB, shown in FIG. 3A. FIG. 3B shows write system 300 with tray 314 in an open position and card 302 fully inserted. As depicted in the Figure, main body 312 includes an open volume beneath tray 314 through which a charge source 322 can access display 308 to write information thereon. In the illustrated example, charge source is an addressable corona source. Charge source 322 may be constituted analogously as the writing unit illustrated with respect to FIG. 2 above. An erasing unit may also be combined with charge source 322 analogously as illustrated above with respect to FIG. 2.

Figure 3C:
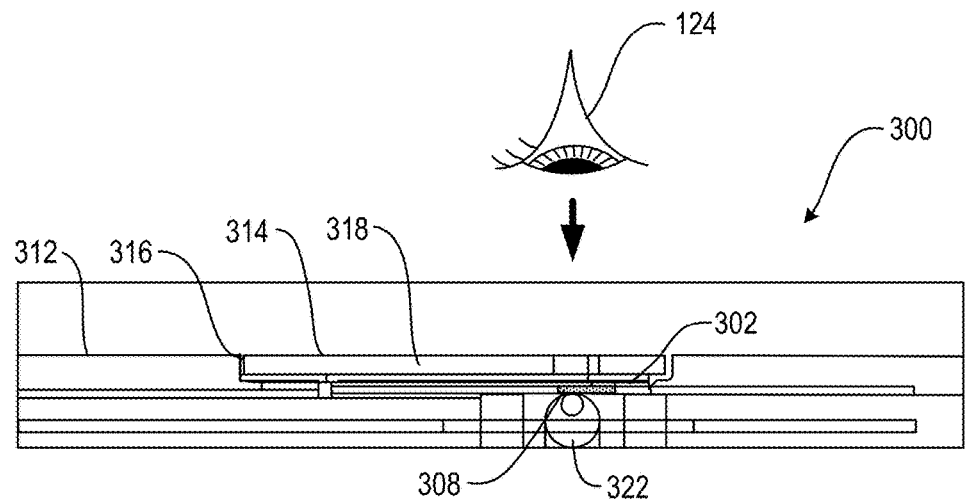

FIG. 3C is a cross sectional view of the portion of write system 300 shown in FIG. 3B with tray 314 in a closed position. At the shown position, charge source 322 has access to display 308. At the closed position, slots in the constraining elements are actuated to reduce the slot width so as to constrain first and second longitudinal substrate sides 304, 306 of card 302. Thereby, constraining elements 320a, 320b facilitate planarity of card 302 at that position so that information can be written into display 308 with a satisfactory clarity. An example of slots for constraining elements 320a, 320b are illustrated below with respect to FIGS. 4A and 4B. Moreover, since the slots at constraining elements 320a, 320b are to receive first and second longitudinal sides 304, 306 a middle portion of card 302 including display 308 is viewable for an external user 124 via transparent front plate 318 while information is being written on display 308. Thereby, user experience can be enhanced.

It will be understood that write system 300 is described merely as an example and that variations thereof are foreseen. For example, but not limited to, any suitable support arrangement may be used to support main body 312 not limited to bottom support 310. Further, main body 312 may be supported at a vertical surface (e.g., a wall) using suitable fixations. Further, write system 300 may include elements to ensure that tray 314 can be closed only when card 302 is fully inserted. Tray 314 may be either manually operated to a locked position or automatically brought down via a motorized mechanism. Such a motorized mechanism might perform tray closing once a user pushes the tray inward. Such a motorized mechanism may initially operate with a small controlled torque to prevent any pinching risk. Once the tray is fully latched, the motorized mechanism may a larger torque to actuate the constraining slots with proper preload, so that the substrate is sufficiently constrained.

Figure 4A:
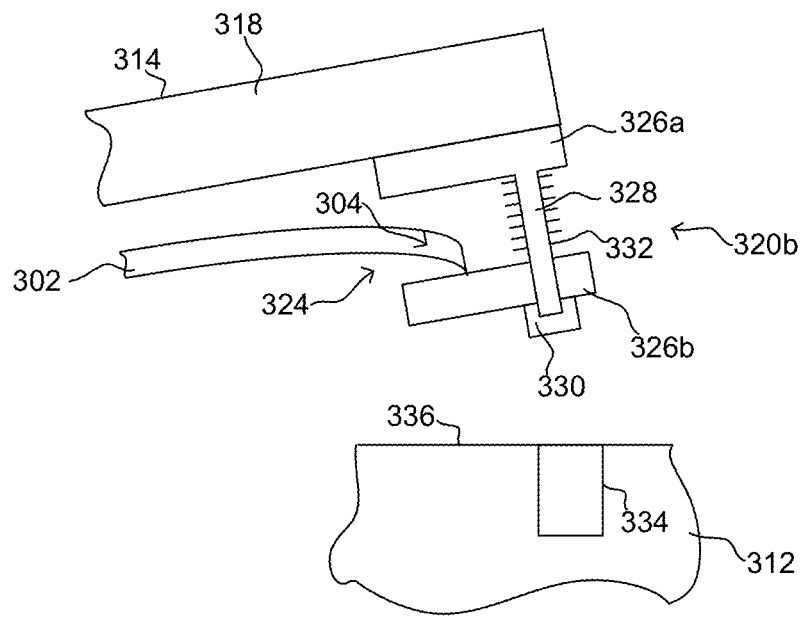
FIGS. 4A and 4B illustrate example mechanisms to implement constraining elements according to some examples.
Figure 4B:
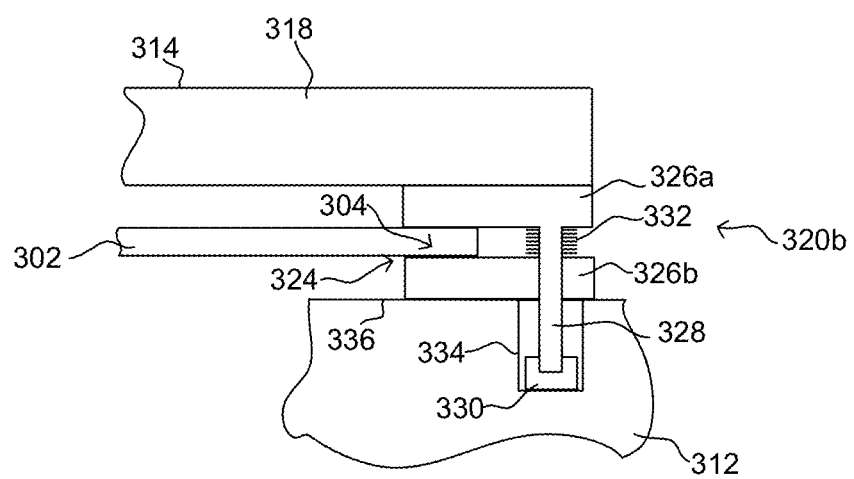

FIGS. 4A and 4B illustrate an example mechanism to implement constraining elements 320a, 320b. More specifically, these Figures show the free end of tray 314 and a portion of write system main body 312, with which constraining element 320b co-operates to actuate slot 324. For the sake of simplicity, the Figures only illustrate constraining element 320b. It will be understood that constraining element 320a can be implemented analogously.

Constraining element 320b includes a slot 324 spanning between two slots members 326a, 326b. The lower slot member 326b is moveable along a pin 328 so that slot 324a is actuable to vary the slot width. Lower slot member 326b is spring loaded against a lock nut 330 using a suitable resilient member 332 (e.g., a spring). Body 312 includes a trench 334 dimensioned and positioned to receive lock nut 330 and a portion of pin 328.

When tray 314 is in an open position (as shown in FIG. 4A) slot members 326a, 326b are separated and the slot width is at its maximum so that longitudinal side 304 of card 302 can be easily inserted into slot 324. When tray 314 is closed (as shown in FIG. 4B), constraining members 326b encounters a top surface 336 of body 312 that produces a displacement of lower constraining member 326b along pin 328 and towards upper constraining member 326a. Thereby, when tray 314 is closed, the slot width is reduced so as to constrain longitudinal side 304 between constraining members 326a, 326b. In addition to the effected constraining of card 302, a high flatness of card 302 is facilitated in the otherwise bent card. As set forth above, high flatness of card 302 facilitates that information can be written on the card display by an external charge source. Write system 300 may also include a releseably latching system so that tray 318 remains at the closed position and can be opened when required.

In at least some of the examples herein, the constraining slots are provided in a transparent writing device configured for sideway insertion of the substrate. Such a writing device may include a substrate path via which the substrate is conveyed from (i) an insertion position where the substrate can be inserted in the system, (ii) further to a central position in which the substrate is constrained via a first and a second slot and the display is operated via an imager, and (iii) to an extraction position from which the substrate can be extracted from the writing system. An example of such a configuration is illustrated in the following with respect to FIGS. 5A and 5B.

Figure 5A:
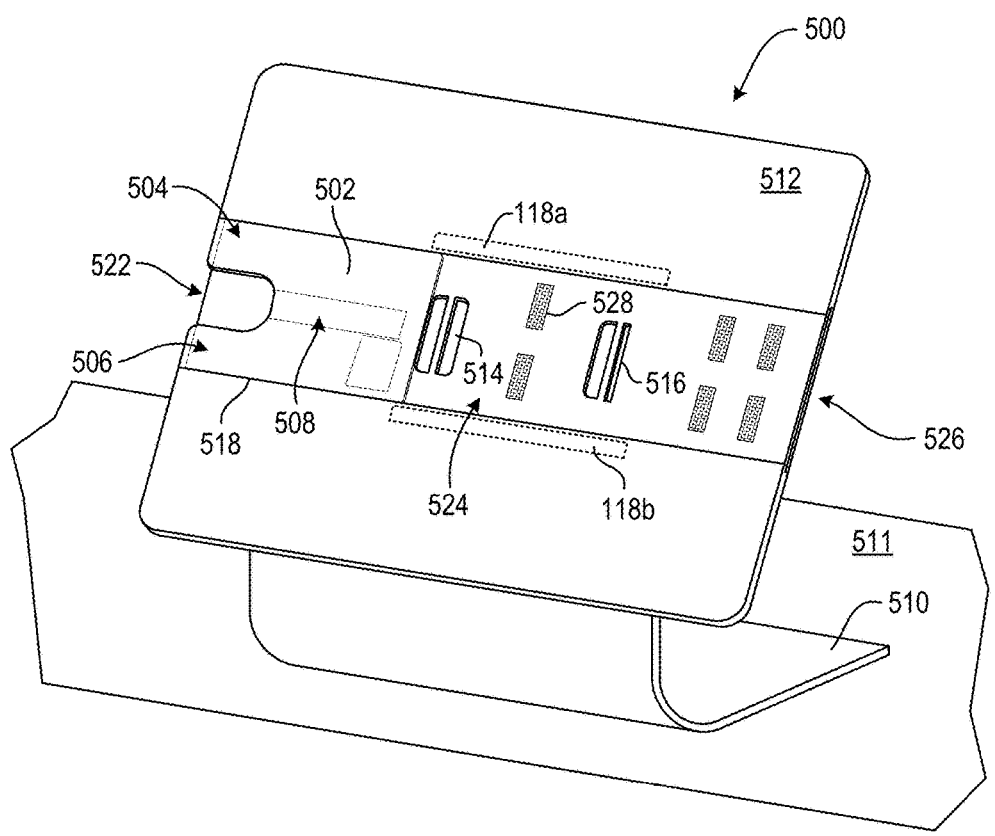
FIGS. 5A and 5B are schematic perspectives of a system to write information on a card according to examples.

FIG. 5A is a schematic perspective of a system 500 to write information on a card 502. Card 502 includes a first longitudinal side 504 and a second longitudinal side 506 opposite to first longitudinal side 504. Card 502 further includes a display 508 including electronic paper to display information thereon. Display 508 may be constituted analogously as described above with respect to FIG. 2.

Write system 500 includes a bottom support 510 to support a main body 512 of the write system on a flat surface 511. Main body 512 includes the mechanisms to perform the writing information on card 502 such as, for example, an erasing unit 514 and a charge source 516. Erasing unit 514 may be constituted analogously as erasing unit 206 illustrated above with respect to FIG. 2, but adapted to erase information on display 508 while card 502 slides beneath erasing unit 514. Writing unit 516 may be constituted analogously as writing unit 206 illustrated above with respect to FIG. 2, but adapted to write information on display 508 while card 502 slides beneath erasing unit 514.

Write system 500 includes a substrate path 518 via which substrate 512 is conveyed for writing information on display 508. Substrate path 518 includes a transparent cover 520 placed so that a user can see display 508 while being conveyed and, more specifically, while information is being written on display 508. Substrate path 518 includes conveying elements to slide the card therethrough and, more specifically, from an insertion position 522 to a central position 524 and further to an extraction position 526. In the illustrated example, motorized rollers 528 are provided along substrate path 518 to convey card 502 therethrough.

First and second constraining elements 118a, 118b are provided at central position 525 so that card 502 is constrained while erasing unit 514 and writing unit 516 are operated. Examples of constraining elements 118a, 118b are illustrated above with respect to FIGS. 1A to 1D. Constraining elements 118a, 118b may constrain card 502 with a constraining force sufficiently high to achieve a required flatness for writing, but sufficiently low for allowing that card 502 can slide through central position 524.

During operation of write system 500, card 502 is inserted at insertion position 522. Then, card 502 is conveyed by rollers 528 to central position 524. At central position 524, information is written on card 502 while sliding beneath erasing unit 514 and writing unit 516. Finally, card 502 is further conveyed to extraction position 526 from which substrate 502 can be extracted from system 512.

Figure 5B:
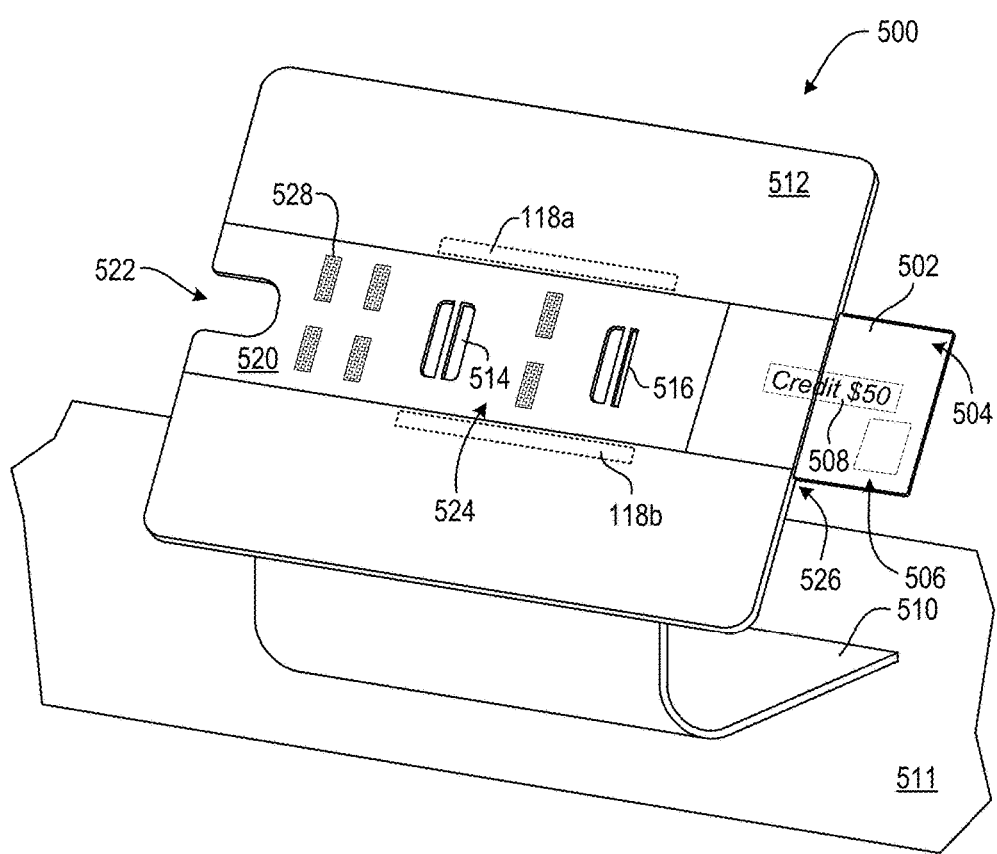
Figure 7A:
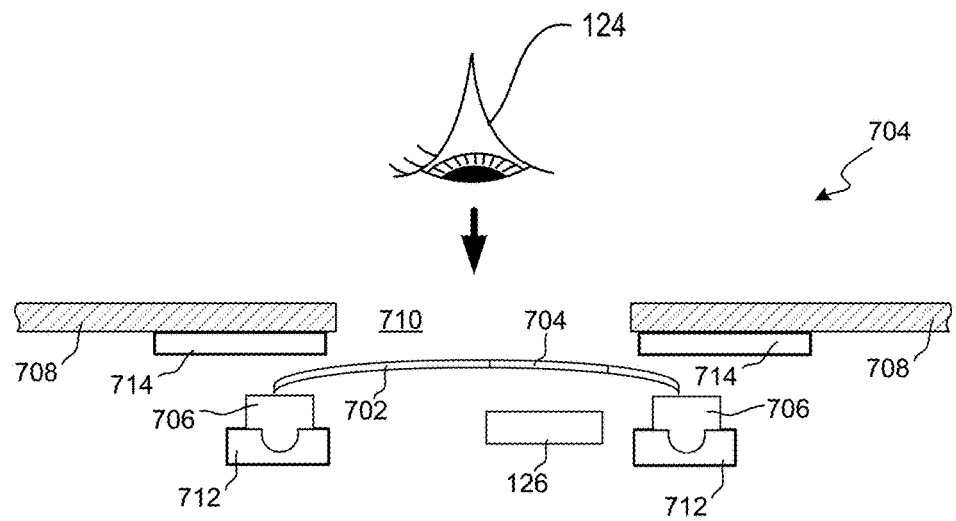
FIGS. 7A and 7B are schematic side views of an mechanism to implement constraining elements in examples herein.
Figure 7B:
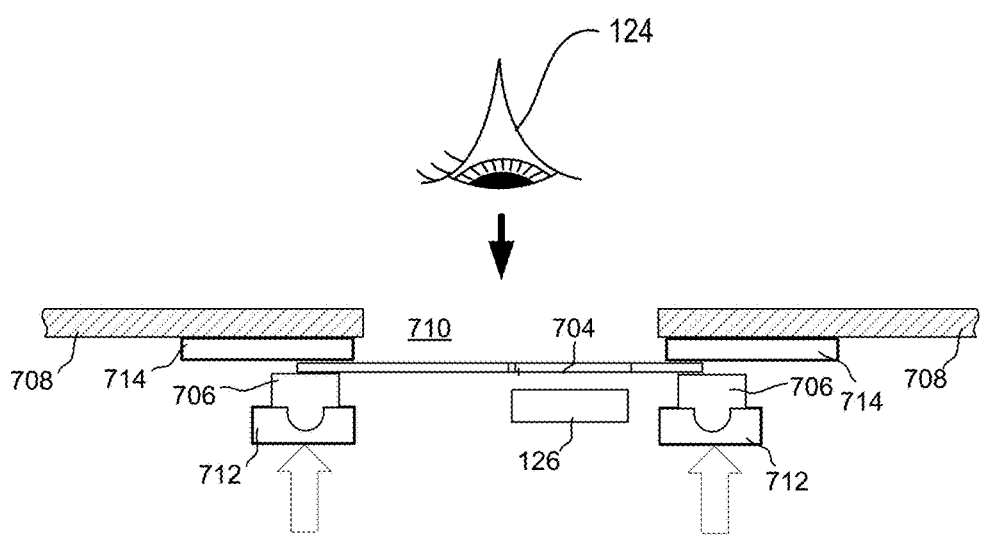

FIGS. 7A and 7B illustrate in a side view an example mechanism to implement constraining elements in for example, a system configuration as shown in FIGS. 5A and 5B. In the example of FIGS. 7A, a card 702 with a re-writable display 704 for being processed by a writing system 700. In the illustrated example, card 702 is conveyed to the writing area, i.e. an area at which display 704 can be accessed by an imager 126. A conveyor belt 706 is provided at a bottom part of system 700 to carry card 702 to the writing position. Writing system 700 further includes an upper cover 708 with an opening 710 via which a user can visualize display 704 while it is being written via imager 126.

As illustrated by FIG. 7B, card 700 can be constrained at the writing area by an upper displacement of actuating elements 712 that support conveyor belt 706. Actuating elements 712 collaborate with contact pads 714 (e.g. Teflon pads) to effect a tight constraining of card 700.

Figure 8A:
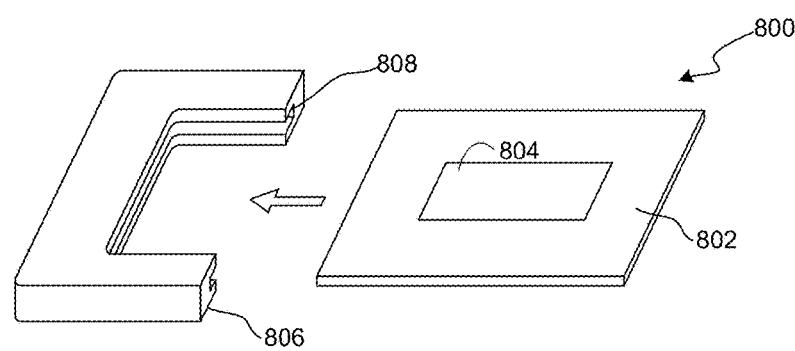
FIGS. 8A to 8C schematically show a further system to write information on a card according to examples herein.
Figure 8B:
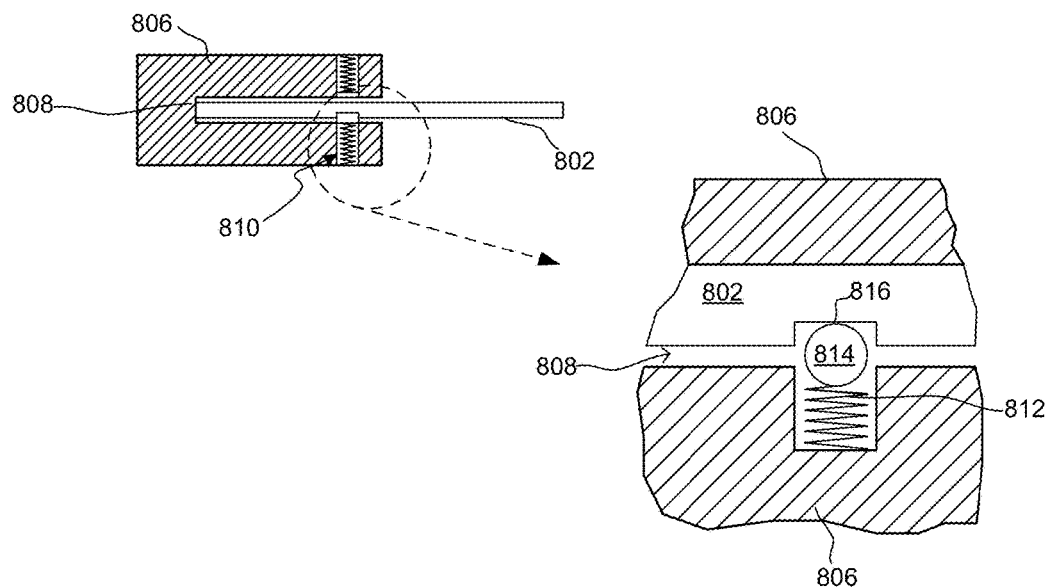
Figure 8C:
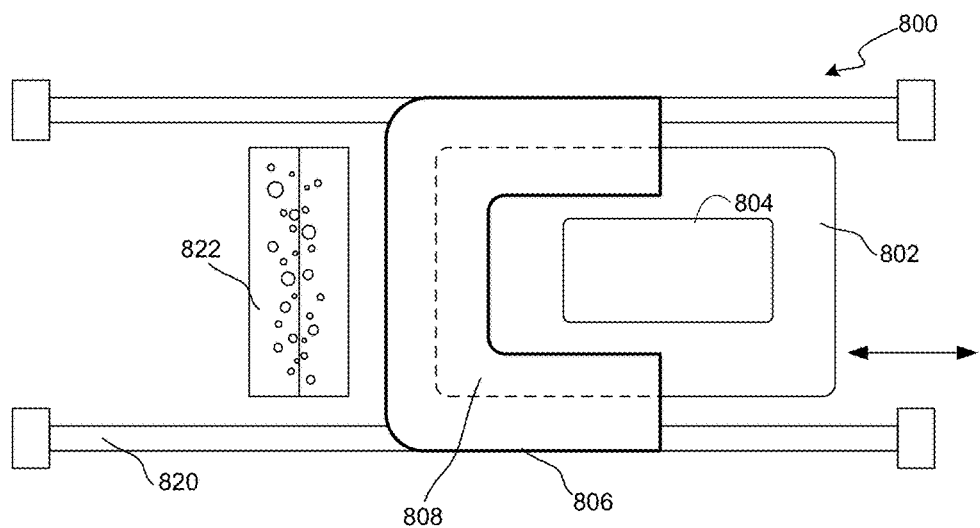

FIGS. 8A to 8C schematically show a further system 800 to write information on a display 804 of a card 802. System 800 includes a shuttle 806 for constraining card 802 during writing thereof at an U-shaped slot 808. Card 802 is to be inserted in shuttle 806 and, more specifically, at slot 808 as shown in FIG. 8B and 8C. Card insertion may be implemented via translation of card 802, via translation of shuttle 806 or a combination of both. For example, shuttle 806 may be stationary and card 802 may be manually or automatically insertable thereon. In another example, card 802 may be held stationary while shuttle 802 is translated via a suitable mechanism (e.g. using motorized belt, lead screws, guide rails or the like).

Slot 808 is adapted to constrain card 802, and more specifically its longitudinal sides, via an actuation mechanism. In the illustrated example, as shown at FIG. 8B, the actuation mechanism at the slot is a spring loaded lock 810. Spring loaded lock 810 is comprised of a pin 812 attached to a spring 814 for resiliently constraining card 802 in slot 808. In this example, card 802 includes a notch 816 to releseably receive pin 814.

FIG. 8C shows a more specific configuration of system 800. In the shown configuration, card 802 is inserted in shuttle 806 via translation of shuttle 806 on linear guides 820. Once card 802 is inserted in shuttle 806, an imager 822 can access from the bottom (considering the shown perspective) display 804. At the same time, since card 802 is constrained at its longitudinal sides via slot 808, display 804 is visible for external inspection while imager 822 writes information thereon.

Figure 6:
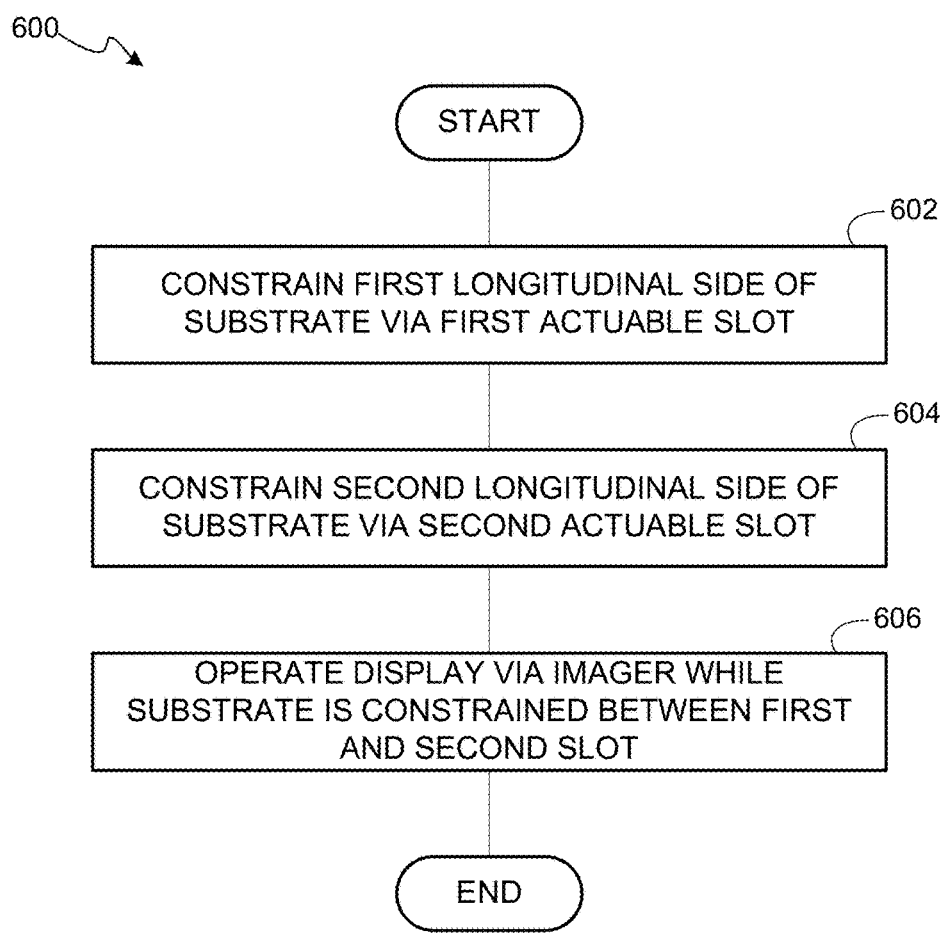
FIG. 6 is a flow chart for implementing at least some of the examples disclosed herein.

FIG. 6 shows a flow chart 600 for implementing at least some of the examples disclosed herein. In discussing FIG. 6, reference is made to FIGS. 1 to 5B to provide contextual examples. Implementation, however, is not limited to those examples.

At block 602, a first longitudinal side of a substrate is constrained via a first actuable slot. For example, looking at FIGS. 1A to 1D, longitudinal side 108 of substrate 100 may be constrained by reducing the size of slot 120a, i.e. by reducing the distance between slot members $120a_1$ and $120a_2$. The constraining may be performed by any suitable actuation such as reduction of slot width as illustrated in previous examples, or other means such as electrostatic actuation or by applying a vacuum at the slot so as to effect a suction force.

At block 604, a second longitudinal side of the substrate is constrained via a second actuable slot. The second longitudinal side is opposite to the first longitudinal side. For example, looking at FIGS. 1A to 1D, longitudinal side 110 of substrate 100 may be constrained by reducing the size of slot 120b, i.e. by reducing the distance between slot members $120b_1$ and $120b_2$.

At blocks 602, 604, the substrate is constrained between the first and second slot with a display positioned therebetween. For example, looking at FIG. 1D, display 102 is between the first and second slots 120a, 120b so that it can be accessed by an imager 126 and externally monitored by an external user 124.

At block 606, the display is operated via an imager while the substrate is constrained between the first and second slot. For example, looking at FIG. 2, writing module 216 writes on electronic paper 201 while substrate 200 is being constrained via closed slots 120a and 120b (only slot members $120b_1$ and $120b_2$ are shown in FIG. 2). Further, since electronic paper 201 is between slots 120a and 120b, a user 124 can monitor information being written during the writing process, thereby significantly enhancing the user experience.

At block 606, a transparent window may be provided opposite the imager so that the display is externally viewable during the dynamic operation of the display. For example, looking at FIG. 1D, transparent volume 122 allows user 124 to monitor display 102 during the writing information. Looking at FIG. 3C, a transparent plate 318 allows that user 124 to monitor display 308 during the writing operation. Looking at FIGS. 5A, 5B transparent cover 520 is placed so that a user can see display 508 while being conveyed through substrate path 518 and, more specifically, while information is being written on display 508.

In at least some of the example above, the substrate is a pocket-sized card. The display includes passive electronic paper that is operable by the imager. The imager is an external element from the substrate. Such a substrate with a passive electronic paper omits electrodes, processor, or energy sources for individually addressing pixels in the electronic paper. The pixel addressing is performed by the external imager, e.g., a charge source as illustrated above with respect to FIG. 2.

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations. Further, flow charts herein illustrate specific block orders; however, it will be understood that the order of execution may differ from that which is depicted. For example, the order of execution of two or more blocks may be scrambled relative to the order shown. Also, two or more blocks shown in succession may be executed concurrently or with partial concurrence. Further, claims reciting "a" or "an" with respect to a particular element contemplate incorporation of one or more such elements, neither requiring nor excluding two or more such elements. Further, at least the terms "include" and "comprise" are used as open-ended transitions.

What is claimed is:

1. A system comprising:
   a first slot to receive a first longitudinal side of the substrate, the first slot including opposite spaced apart first slot members actuable into contact against opposite faces of the substrate to constrain the first longitudinal side;
   a second slot to receive the second longitudinal side of the substrate, the second slot including opposite spaced apart second slot members actuable into contact against opposite faces of the substrate to constrain the second longitudinal side,
   the first slot and the second slot being actuable to respectively constrain the first and the second longitudinal sides to write information on a display of the substrate.

2. The system of claim 1, comprising
   a transparent volume defined between the first and the second slot to arrange the display to be externally viewable on a first face of the substrate through the transparent volume by a user while the first and the second longitudinal sides of the substrate are constrained at the respective first and second slots.

3. The system of claim 2, comprising:
   an imager positioned, in an area adjacent an opposite second face of the substrate, opposite to the transparent volume to operate the display, including writing information, while the first and the second longitudinal sides are constrained by the respective first and second slots.

4. The system of claim 3, wherein the display includes electronic paper and the imager includes a writing device to operate the electronic paper, including writing information, passing in relation to the writing device.

5. The system of claim 3, wherein the first and second slot are provided in a moveable tray, wherein in an open position of the tray the substrate is insertable or extractable from the first and second slots, and wherein in a closed position of the tray the substrate is operable by the imager.

6. The system of claim 3, further comprising a substrate path via which the substrate is conveyed:
   from an insertion position in which the substrate is insertable in the system;
   further to a central position in which the substrate is constrained via the first and the second slots and the display is operable via the imager; and
   to an extraction position from which the substrate is extractable from the system.

7. The system of claim 6, comprising an automatic conveyor system to convey the substrate through the substrate path.

8. The system of claim 1, wherein actuation of the first slot members into contact against opposite faces of the substrate is to cause a reduced slot width between the respective second slot members and wherein actuation of the second slot members into contact against opposite faces of the substrate is to cause a reduced slot width between the respective second slot members.

9. The system of claim 1, wherein at least one of the first slot or the second slot is continuous.

10. The system of claim 9, comprising:
    a charge source to produce a charge beam to write on the electronic paper, the charge source positionable adjacent an opposite second face of the card to be operated opposite to the transparent window when the card is constrained at the first and second slot.

11. A system to write information on a card, the system comprising:
    a first slot to receive a first longitudinal side of the card, the first slot including opposite first slot members actuable into contact against opposite faces of the card to constrain the first longitudinal side;
    a second slot to receive a second longitudinal side of the card, the second slot including opposite second slot members actuable into contact against opposite faces of the card to constrain the second longitudinal side; and
    a transparent window positioned between the first slot and the second slot and through which a display, including electronic paper on which information is displayable, of the card is externally viewable on a first face of the card by a user when the card is constrained at the first and second slot.

12. A method to interface with a display on a substrate, the method comprising:
    arranging the substrate with the display in a position between a first longitudinal side and a second longitudinal side of the substrate;
    constraining the first longitudinal side of the substrate via first actuable slot members movable into contact against opposite faces of the substrate at the first longitudinal slide;
    constraining the second longitudinal side of the substrate, opposite to the first longitudinal side, via second actuable slot members movable into contact against opposite faces of the substrate at the second longitudinal side; and
    operating the display to write information, via an imager, on a second face of the substrate while the substrate is constrained between the first slot members at the first longitudinal side and between the second slot members at the second longitudinal side.

13. The method of claim 12, comprising:
    arranging transparent window to extend from the first slot members to the second slot members and to be opposite the imager so that a first face of the substrate, including the display, is externally viewable through the transparent window by a user during the dynamic operation of the display.

14. The method of claim 12, comprising:
    arranging the display of the substrate to include electronic paper and arranging the imager to include an ion head, wherein the writing includes producing an ion beam via the ion head to write on the electronic paper.

15. The method of claim 12, comprising:
arranging the substrate as a pocket-sized card and arranging the display to include passive electronic paper that is operable by the imager, the imager being an external element from the substrate.

* * * * *

UNITED STATES PATENT AND TRADEMARK OFFICE
CERTIFICATE OF CORRECTION

| | |
|---|---|
| PATENT NO. | : 10,224,002 B2 |
| APPLICATION NO. | : 15/036793 |
| DATED | : March 5, 2019 |
| INVENTOR(S) | : Napoleon J Leoni et al. |

It is certified that error appears in the above-identified patent and that said Letters Patent is hereby corrected as shown below:

In the Claims

In Column 12, Line 45, Claim 12, delete "slide;" and insert -- side; --, therefor.

Signed and Sealed this
Ninth Day of July, 2019

Andrei Iancu
*Director of the United States Patent and Trademark Office*